Sept. 12, 1933.　　　　H. H. ROBINSON　　　　1,926,177
COUPLING MECHANISM FOR TRACTORS AND TRAILERS
Filed April 2, 1932　　　3 Sheets-Sheet 1
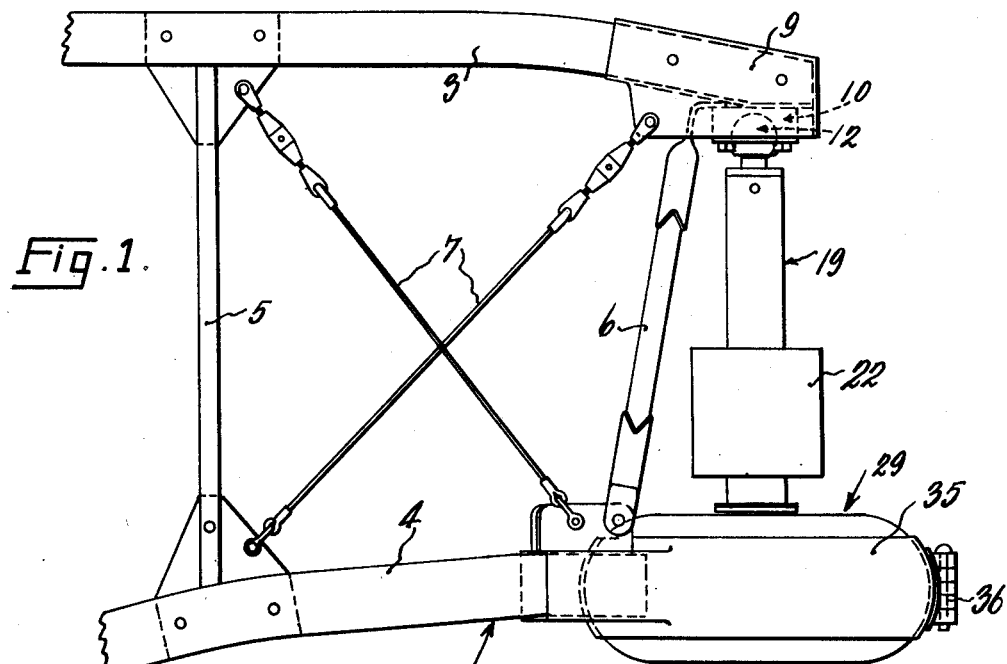
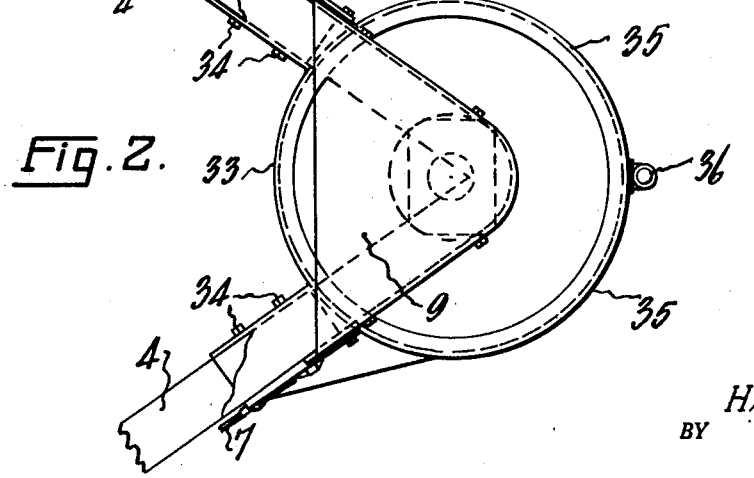
INVENTOR.
HAROLD H. ROBINSON
BY
Chapin & Neal
ATTORNEYS.

Sept. 12, 1933.   H. H. ROBINSON   1,926,177
COUPLING MECHANISM FOR TRACTORS AND TRAILERS
Filed April 2, 1932   3 Sheets-Sheet 2
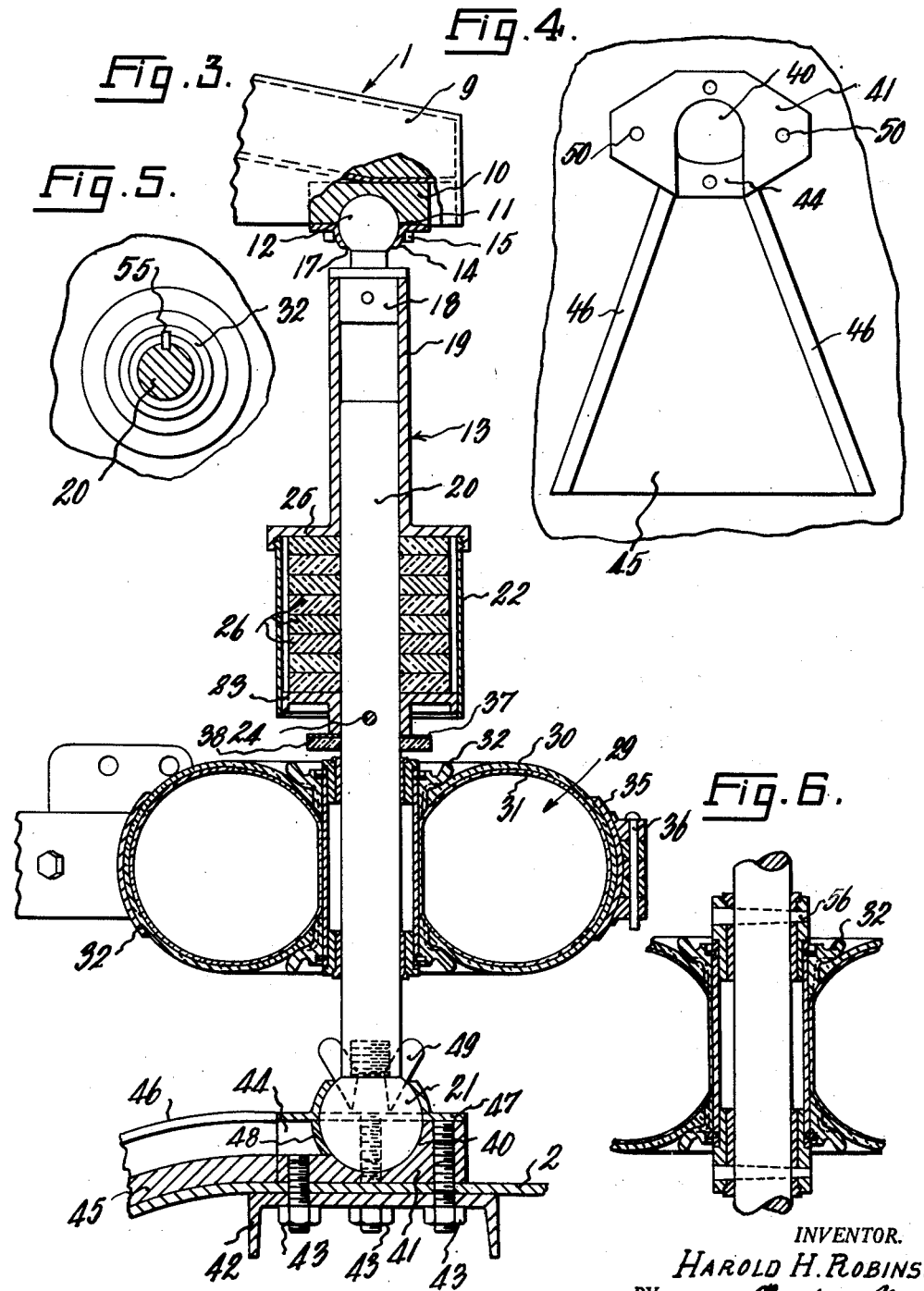
INVENTOR.
HAROLD H. ROBINSON
BY Chapin & Neal
ATTORNEYS.

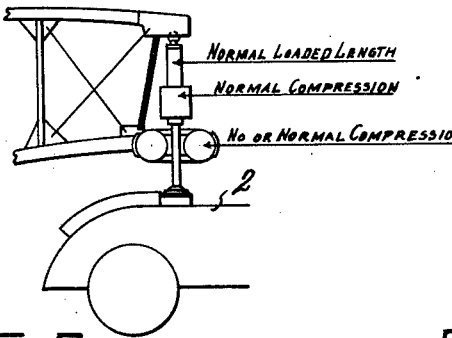
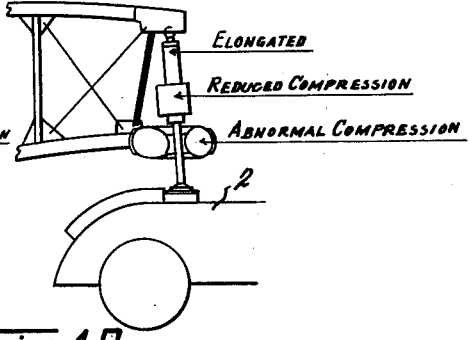
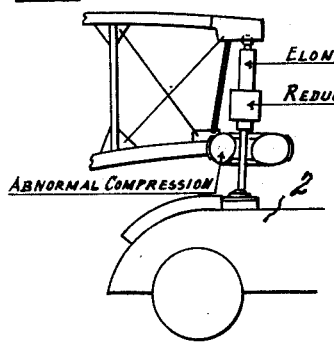
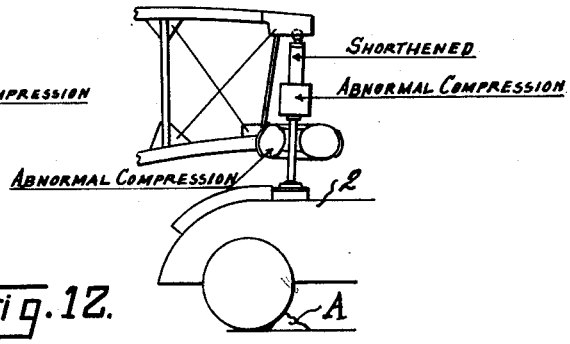
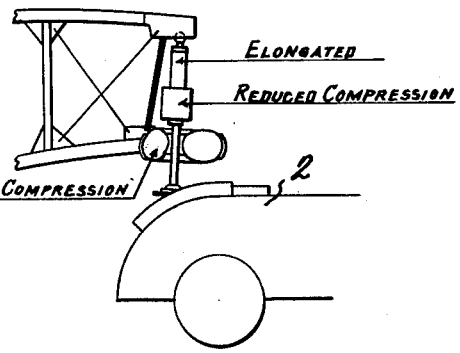
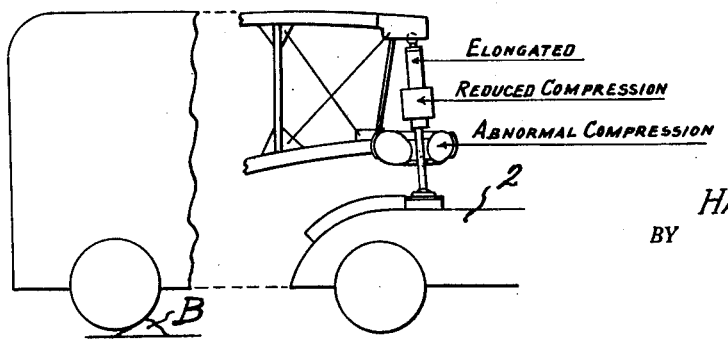

Patented Sept. 12, 1933

1,926,177

UNITED STATES PATENT OFFICE 1,926,177

COUPLING MECHANISM FOR TRACTORS AND TRAILERS

Harold H. Robinson, Opa Locka, Fla., assignor to Curtiss Aerocar Company, Inc., Opa Locka, Fla., a corporation of Florida Application April 2, 1932. Serial No. 602,753

21 Claims. (Cl. 280—33.1)

This invention relates to a coupling mechanism for connecting a tractor vehicle and a trailer vehicle together and in form shown more particularly adapted for the connection of a tractor and semi-trailer. It has among its objects the provision of a structure of this character in which the weight of the trailer vehicle upon the tractor vehicle is resiliently supported, and in which the draft action between the two vehicles is resiliently cushioned in all angular positions of the vehicles. A further object is to so arrange the weight supporting members and the draft sustaining members that in co-operation they afford a greatly improved flexibility in operation and increased facility in coupling and uncoupling the vehicles. A particular advantage of the present improvement will be found in its employment with passenger carrying trailers of light weight construction which are extremely sensitive to any shocks or vibrations transmitted thereto from the tractor. The coupling mechanism of this invention is designed to reduce such shocks to the point of negligible damage or discomfort and to substantially insulate the trailer from the usual vibrations of the tractor.

A still further object of the invention is an arrangement of coupling mechanism which will induce through the operation of natural forces a proper banking of the trailer when turning corners at high speed thus giving enhanced comfort and safety to the passengers. These, and other and further objects will be more fully disclosed in the following specification and claims.

In the accompanying drawings which illustrate one embodiment of the invention,

Fig. 1 is a side elevation;

Fig. 2 is a plan view of the structure shown in Fig. 1;

Fig. 3 is an elevation partly in section and on a larger scale, showing the parts in operative relation;

Fig. 4 is a detail plan view of the coupling guide and the coupling block carried by the tractor vehicle;

Fig. 5 is a plan view showing a modified manner of mounting the hub or the coupling pin;

Fig. 6 is a sectional view showing another modification in the hub mounting; and Figs. 7 to 12 inclusive, are diagrammatic views showing the action of the parts under various conditions of operation.

While not limited to such use the invention has a special utility in coupling passenger carrying trailers to conventional pleasure motor cars as tractors, and in the drawings 1 designates the prow of such a trailer and 2 designates the rear deck of a conventional roadster as the tractor. It will be observed in Figs. 1 and 11 that the front end of the trailer frame overlaps the rear end of the tractor and that this trailer frame is part of a relatively high body extending a substantial distance above the deck of the tractor 2.

As shown the trailer frame includes converging upper longérons 3 and converging lower longérons 4, the upper and lower longérons being connected by suitable struts, as indicated at 5 and 6 and tension members 7. The forward end of the upper longérons are secured to a generally triangular upper bow plate 9 to the underside of which assembly is rigidly fastened a block 10 provided with a substantially hemispherical seat 11 adapted to receive the spherical head 12 of the upstanding stem 13. The head 12 of the stem is kept in its seat 11 by a parti-spherical cap plate 14 bolted as at 15 to block 10, and provided with an opening 17 through which the stem extends. The opening 17 is of sufficient size to permit a substantial oscillatory movement of the stem in all directions. The construction above described constitutes a universal joint as well as a swivelling joint for the upper end of the stem 13 and trailer frame.

The stem 13 supports the front end of the trailer on the tractor and is preferably formed of telescoping members associated with shock absorbing means to cushion its load. As best shown in Fig. 3 head 12 is formed integral with a short stud 18 rigidly fixed in the upper end of a tubular member 19. A rod 20 is slidably fitted in the tubular member 19 and is provided detachably secured at its lower end with a spherical head 21 adapted to be coupled to the tractor as will be later described. The tubular member 19 is provided at its lower end with an enlarged concentric cylinder 22 in which a piston 23 pinned as at 24 to the rod 20 is adapted to slide. Confined between piston 23 and the head 25 of cylinder 22 are a plurality of annular resilient discs 26 which may be of rubber or equivalent material. The structure described constitutes shock absorbing means for the telescoping stem and it will be evident that that portion of the weight of the trailer which is carried by the tractor is transmitted to the latter through head 12, member 19, cylinder head 25, discs 26, piston 23 and rod 20, and that all vertical jars and shocks originating in the operation of the tractor are substantially absorbed by the rubber discs.

Intermediate the piston 23 and lower head 21, the rod 20 passes through an annular resilient cushion. In practice, this cushion may take the form of a conventional pneumatic tired wheel, preferably and as shown in the drawings, an aeroplane wheel 29 of the type in which the tire casing 30 with its inner tube 31 is mounted directly on a hub 32 without intermediate spokes or other wheel structure. Since this wheel including the hub are of conventional construction, their detailed description is not necessary. An annular plate 37 is fixed to the base of the piston 23 and has upon its under side a buffer 38 to cushion the contact between the piston and the wheel hub upon downward movement of rod 20.

The wheel 29 is nonrotatably mounted on the trailer by means of clamping members carried by the lower longérons 4 and adapted to engage the tread portion of the tire 30. As best shown in Figs. 1 and 2 the clamping means comprises a concave segmental member 33, bolted as at 34 to the inside faces of the lower longérons 4, and concave members 35 hinged together as at 36 and having their free ends secured to the outer faces of the lower longérons by the bolts 34. It is intended that the wheel 29 shall remain mounted on the trailer as a permanent part thereof under normal conditions and when the trailer is uncoupled from the tractor. However, for replacing or repairing a tire it will be desirable to remove the wheel and this may be accomplished by unbolting and removing members 35 whereby the tire and wheel may be released. Thereafter the rod 20 with the wheel thereon may be withdrawn from the member 19. If it is desired to withdraw rod 20 from the hub of the wheel, either pin 24 is removed or the ball head 21 is detached from said rod 20.

The lower head 21 of rod 20 is adapted to seat in a generally hemispherical recess 40 formed in a block 41 supported in the rear deck of the tractor vehicle 2 by suitable framing as indicated at 42 and held in place by bolts 43. The connection of head 21 to the tractor constitutes the means by which the two vehicles are coupled and uncoupled and the coupling and uncoupling operation is facilitated by partially cutting away the wall of the seat 40 toward the rear of the tractor as shown at 44 to permit entrance of the head 21. A flared and upwardly inclined guide plate 45, provided with vertical side flanges 46, is secured to the sloping deck of the tractor to guide the head 21 into seat 40 as the tractor is backed beneath the prow of the trailer. Head 21 carries a cap plate 47 generally similar to upper plate 14 previously described, but provided with an arcuate curved depending lip 48 at the rear side thereof, adapted to retain the cap in position on the head 21 when the vehicles are disconnected and to close the opening 44 in seat 40 when the head is positioned therein. Plate 47 is releasably secured to block 41 for coupled operation of the vehicles by two wing nuts 49 threaded onto two of the bolts 43 which project upwardly from the threaded recesses 50 at the sides of the block 41.

Considering the operation of the described coupling structure as a whole, it will be seen that the stem is rotatably swivelled at its upper end to the trailer prow at an elevated point of the latter; that it is resiliently contractible and extensible, and that it is resiliently constrained toward a vertical position by the pneumatic tire of wheel 29 in the hub of which the pin may both slide and turn. As a result of this arrangement it will be seen that when the lower end of the stem is coupled to a tractor vehicle, the weight of the trailer imposed upon the tractor is directly transmitted to the latter through the stem and vertical shocks incident to the combined operation of the vehicles are absorbed by the rubber discs of the stem shock absorbing means. Further, regardless of the angular position of the tractor with respect to the trailer, inequalities in the draft action from whatever cause are cushioned by a swinging movement of the stem against the cushion provided by the pneumatic tire, the stem at the same time elongating or shortening as conditions may require.

It will be observed that the weight of the trailer front end is pivotally hung from the top of the upright stem which is substantially above the center of gravity of the trailer body. This induces a pendulum-like action of the trailer front end dampened by the resilient restraint of the pneumatic tire but which nevertheless is sufficient to produce proper banking of the trailer on turns at high speed.

The mode of action under various conditions of operation is diagrammatically illustrated in Figs. 7 to 12 inclusive.

In Fig. 7 is shown the positions of the parts when the coupled vehicles are stationary or in motion without abnormal draft action between them. In this situation, stem 13 is substantially vertical and of normal length. The buffer discs within the cylinder 22 are under the normal compression due to the weight of the trailer and tire 29 is under no, or only normal draft compression.

In Fig. 8 is shown the position of the parts when starting. The increased drag due to the inertia of the trailer causes the stem 13 to be tilted from its vertical position, the tire 29 being compressed on its forward side, thus cushioning the shock of starting, and stem 13 being elongated with an accompanying reduction in the compression of the discs with the cylinder 22.

Under conditions of stopping as shown in Fig. 9 the inertia of trailer causes it to over-travel the tractor with a consequent reverse tilting and elongation of stem 13, the shock of the stop being reduced by compression of the tire 29 on its rearward side.

When, as shown in Fig. 10, the tractor strikes a road obstacle A which impedes its progress and thrusts it upwardly, the upward shock or jolt is absorbed by abnormal compression of the discs in the cylinder 22 accompanied by a shortening of the stem while the shock in the direction of draft is cushioned by tire 29 in a manner similar to the action in stopping the vehicles.

In Fig. 11 is shown the action when the trailer rides over a road obstruction B which impedes its progress, the action being similar to that in starting, the incident shocks being cushioned in a similar manner.

Fig. 12 illustrates the manner in which the shock of coupling the two vehicles together is absorbed and the coupling operation facilitated by the present invention. Assuming the trailer to be stationary and its forward end jacked up to a height approximating operating position, the tractor vehicles is backed beneath the prow of the trailer. The lower head 21 of the stem 13 engaging guide 45 yields against the thrust of the tractor compressing tire 29, the stem 13 elongating as it is dragged up the sloping deck and then shortening, as it rides over the lip of the coupling seat, and snapping into place by the combined action of the rubber discs and the tire 29. It will be thus seen that the coupling operation is accomplished without jar to the trailer or its occupants. In the uncoupling operation the action is reversed, as will be obvious, but with a similar cushioning of the shocks.

The above illustrations of the operation of the device under various shock inducing conditions, which have been isolated for the sake of illustration, will be sufficient to indicate the extreme flexibility of the device and its ability to absorb every combination of vertical and horizontal shock incident to tractor and trailer operation, in every angular position of the vehicles.

In the construction of Figs. 1, 2 and 3, stem 13 is free to turn or slide in the hub 32 of the wheel, permitting the horizontal swinging movement between the tractor and trailer to take place at either end of stem 13, that is, the stem may remain stationary in seat 40, head 12 turning in seat 11 and stem 13 turning in hub 32, or the stem 13 may remain stationary with respect to seat 11 and hub 32 and turn in seat 40, or again the turning action may take place in both seats. If it is desired to confine the swivelling action to the lower seat, hub 32 may be splined to rod 20 as indicated at 55 in Fig. 5, this arrangement still permitting the rod to slide freely in the hub. In Fig. 6 the rod 20 is shown pinned as at 56 to the hub 32. This arrangement not only confines the turning action to the lower seat but prevents sliding of the rod in the hub, thus causing tire 29 to share and supplement the cushioning action of the discs 26.

What I claim is:

1. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame.

2. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, said stem adapted to bear the load of said trailer on said tractor and being associated with shock absorbing means to cushion said load.

3. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, and means for resiliently sustaining said stem in its upright position.

4. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, said stem adapted to bear the load of said trailer on said tractor and being associated with shock absorbing means to cushion said load, and means for resiliently sustaining said stem in its upright position.

5. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, and means for resiliently sustaining said stem in its upright position, comprising an annular cushion device surrounding said stem intermediate its upper and lower ends.

6. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, and means for resiliently sustaining said stem in its upright position, comprising an annular cushion device surrounding said stem intermediate its upper and lower ends, said cushion device being carried by said trailer frame.

7. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, and means for resiliently sustaining said stem in its upright position comprising an annular cushion device surrounding said stem intermediate its upper and lower ends, said cushion device being carried by a lower portion of said trailer frame.

8. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, said stem adapted to bear the load of said trailer on said tractor and being associated with shock absorbing means to cushion said load, and means for resiliently sustaining said stem in its upright position comprising an annular cushion device surrounding said stem intermediate its upper and lower ends, said cushion device being carried by said trailer frame.

9. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, said stem adapted to bear the load of said trailer on said tractor and being associated with shock absorbing means to cushion said load, and means for resiliently sustaining said stem in its upright position comprising an annular cushion device surrounding said stem intermediate its upper and lower ends, said cushion device being carried by a lower portion of said trailer frame.

10. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, said stem adapted to bear the load of said trailer on said tractor and comprising telescoping sections in association with a shock absorbing cylinder for cushioning said load.

11. In combination with a tractor and trailer wherein the trailer frame overlaps the rear end of the tractor and extends a substantial distance above the same, a coupling mechanism therefor comprising an upstanding stem arranged to provide a swivelling connection between said tractor and trailer, said stem being connected at its lower end by a universal joint to said tractor and at its upper end by a universal joint to the uppermost portion of said trailer frame, said stem adapted to bear the load of said trailer on said tractor and comprising telescoping sections in association with a shock absorbing cylinder for cushioning said load, and means for resiliently sustaining said stem in upright position comprising a pneumatic tired wheel, the hub of which surrounds said stem and the tread of which is carried by said trailer frame.

12. In a vehicular combination wherein two vehicles are connected together for articulated tractor trailer operation, coupling mechanism for connecting the two vehicles which comprises a normally upright stem, means connecting one end of the stem to one of said vehicles and means connecting the other end of said stem to the other of said vehicles, both of said connecting means permitting oscillatory movement of the stem in all directions with respect to the vehicles and means to cushion the oscillatory movements of the stem in all directions.

13. In a vehicular combination wherein two vehicles are connected together for articulated tractor trailer operation, coupling mechanism for connecting the two vehicles which comprises a normally upright load supporting stem, means connecting one end of the stem to one of said vehicles and means connecting the other end of said stem to the other of said vehicles, both of said connecting means permitting oscillatory movement of the stem in all directions with respect to the vehicles, means to cushion the oscillatory movements of the stem in all directions and means to cushion shocks transmitted longitudinally of the stem.

14. In a vehicular combination wherein two vehicles are connected together for articulated tractor trailer operation, coupling mechanism for connecting the two vehicles which comprises a horizontally positioned wheel with a resilient tire non-rotatably secured by its tread portion to one of said vehicles, a normally upright load supporting resiliently cushioned stem engaged in the hub of said wheel and having one end connected to said wheel supporting vehicle for oscillatory movement in all directions, and means to releasably couple the opposite end of said stem to the other vehicle for oscillatory and pivotal movement.

15. In a vehicular combination wherein two vehicles are connected together for articulated tractor trailer operation, coupling mechanism for connecting the two vehicles which comprises a horizontally positioned wheel with a resilient tire, non-rotatably secured by its tread portion to one of said vehicles, a normally upright load supporting, resiliently cushioned stem slidably and rotatably engaged in the hub of said wheel and having one end connected to said wheel supporting vehicle for oscillatory movement in all directions, and means to releasably couple the opposite end of said stem to the other vehicle for oscillatory and pivotal movement.

16. In a vehicular combination wherein two vehicles are connected together for articulated tractor trailer operation, coupling mechanism for connecting the two vehicles which comprises a horizontally positioned wheel with a resilient tire, non-rotatably secured by its tread portion to one of said vehicles, a normally upright load supporting stem slidably and rotatably engaged in the hub of said wheel, said stem including telescoping members resiliently connected together, means connecting one end of said stem to the wheel supporting vehicle for oscillatory movement in all directions and means to couple the opposite end of said stem to the other vehicle for oscillatory and pivotal movement.

17. In a vehicular combination wherein two vehicles are connected together for articulated tractor trailer operation, coupling mechanism for connecting the two vehicles which comprises a horizontally positioned wheel with a resilient tire non-rotatably secured by its tread portion to one of said vehicles, a normally upright load supporting stem slidably and rotatably engaged in the hub of said wheel, said stem including telescoping members, a cylinder carried by one of said members, a piston head carried by the other member and slidable within the cylinder and a resilient rubber cushion within the cylinder positioned to be compressed by the load on the stem, means connecting one end of said stem to the wheel supporting vehicle for oscillatory and pivotal movement and means to releasably couple the opposite end of said stem to the other vehicle.

18. A combination as in claim 5 wherein the stem is slidably but non-rotatably engaged in the hub.

19. A combination as in claim 5 wherein the stem is held against sliding and rotatable movement with respect to the hub.

20. In a vehicular combination wherein two vehicles are connected together for articulated tractor trailer operation, coupling mechanism for connecting the two vehicles together which comprises a normally upright stem, means connecting one end of the stem to one of said vehicles and means connecting the other end of said stem to the other of said vehicles, said connections between the ends of the stem and the vehicles being such as to permit oscillatory movement of the stem with respect to both vehicles, and means to cushion said oscillatory movements of the stem.

21. In a vehicular combination wherein two vehicles are connected together for articulated tractor trailer operation, coupling mechanism for connecting the two vehicles together which comprises a normally upright stem, means connecting one end of the stem to one of said vehicles and means connecting the other end of said stem to the other of said vehicles, said connections between the ends of the stem and the vehicles being such as to permit oscillatory movement of the stem with respect to both vehicles, means to cushion said oscillatory movements of the stem and means to cushion shocks transmitted longitudinally of the stem.

HAROLD H. ROBINSON.